United States Patent [19]

Shoemaker

[11] Patent Number: 4,556,200
[45] Date of Patent: Dec. 3, 1985

[54] RE-RAILING JACK

[75] Inventor: Leon H. Shoemaker, Russell, Ky.

[73] Assignee: National Mine Service Company, Pittsburgh, Pa.

[21] Appl. No.: 529,692

[22] Filed: Sep. 6, 1983

[51] Int. Cl.⁴ .............................................. B66F 9/04
[52] U.S. Cl. .................................................. 254/424
[58] Field of Search ................ 254/420, 422, 424, 35, 254/98, 100–101; 104/261

[56] References Cited

U.S. PATENT DOCUMENTS

| | | |
|---|---|---|
| 862,609 | 8/1907 | Carberry . |
| 981,617 | 1/1911 | Cornelius et al. . |
| 1,062,871 | 5/1913 | Aaron . |
| 1,081,013 | 12/1913 | Bunn .................................. 254/424 |
| 1,088,236 | 2/1914 | Lutenberger . |
| 1,099,405 | 6/1914 | Stein . |
| 1,107,706 | 8/1914 | Rundle . |
| 2,784,985 | 3/1957 | Schnell ................................ 254/420 |
| 4,205,825 | 6/1980 | Stanford ............................. 254/420 |

Primary Examiner—Robert C. Watson
Attorney, Agent, or Firm—Stanley J. Price, Jr.

[57] ABSTRACT

A re-railing jack for returning derailed track vehicles to the track includes a threaded jack screw pivotally mounted in a ground supported swivel base. A jack housing is longitudinally movable on the jack screw in response to rotation of the jack screw by a ratchet which engages the jack screw. The jack housing includes a first portion threadedly engaged to the jack screw and a second integral portion positioned in the coupler pocket which normally receives the automatic coupler of the track vehicle. The housing second portion is retained in the coupler pocket by the same pin which holds the coupler in place. The pin extends through transverse slots of the jack housing permitting the housing to pivot within the coupler pocket about the point of connection of the housing to the vehicle. The jack is thus safely connected to the vehicle in an efficient manner which facilitates lifting and combined downward lateral movement of the vehicle back on to the track.

12 Claims, 7 Drawing Figures

RE-RAILING JACK

BACKGROUND OF THE INVENTION

1. Field of the Invention

This invention relates to a jack for returning the wheels of a derailed rail car to the track and, more particularly, to a re-railing jack adaptable for removable connection and pivotal movement in the receiver for the coupling of the rail car.

2. Description of the Prior Art

Lifting jacks, as disclosed in U.S. Pat. No. 1,088,236, are known for replacing a derailed rail car upon a track. The lifting operation requires vertically raising the wheels of the rail car above the upper level of the track and then laterally moving and simultaneously permitting the car to fall in a downward arc about the base of the jack onto the track. The above referenced patent discloses a bearing secured to the underside of the rail car adjacent and separate from the rail car coupler. The bearing receives a support for a lifting screw in which the support and the lifting screw are pivotally supported by the bearing. The upper end of the lifting screw is slidably connected to the upper edge of the car body, and the lower end is provided with a swivel base. A hand operated ratchet is provided for rotating the screw in either direction to raise and lower the car.

U.S. Pat. No. 1,062,871 discloses a lifting jack which is movable along the track. The lifting jack is connected to the car body in a manner to permit the jack to be swung about a horizontal axis into and out of an operative position. In this manner, the jack is carried on the rail car in a position where it is entirely out of the way when not in use. U.S. Pat. Nos. 862,609; 981,617; 1,099,405 and 1,107,706 also disclose lifting jacks movable into and out of position for re-railing a derailed rail car or for transferring a rail car from one set of tracks to another.

Lifting jacks, which are not connected to the rail car which is lifted and moved into position on the track, are considered hazardous to operating personnel because of the tendency for the jack to be displaced and fly out in a random direction when the vehicle is moved laterally and downwardly with the jack extended. Even though the lifting jacks which are not connected to the car body are provided with swivel bases in most cases, when the vehicle has to move laterally at an angle for a considerable distance, the base has a tendency to shift and move out of contact with the ground resulting in a sudden downward, uncontrolled movement of the vehicle which can result in serious bodily injury to operating personnel.

While the above-described lifting devices, which are attached to the vehicle, have attempted to solve the problem of uncontrolled shifting movement of the jack and prevent resultant injury which may occur, major modifications are required to the jack and the vehicle so that the jack can be connected to the vehicle in a manner to be easily moved to an out-of-way position on the vehicle. Due to the expense and lack of versatility of lifting jacks which are permanently secured to vehicles, they have not been generally accepted for use on rail vehicles operated either above or below ground, as for example on locomotives and rail cars used in underground mining operations. Furthermore, permanently securing a lifting jack to a vehicle limits that lifting jack to that specific vehicle, thereby requiring every vehicle to have a lifting jack. This constitutes a substantial expenditure to the operator. Consequently, the separate jacks which are known to be inherently dangerous are still being commonly used, particularly with underground track equipment.

There is a need for a jack for lifting a derailed vehicle upon a track where the jack is removably secured to the vehicle to be lifted in a manner which prevents the jack from flying out in a random direction and can be easily connected and disconnected from the vehicle without requiring major modifications to be made to the vehicle or requiring detailed construction of the jack. While it has been suggested to provide lifting jacks which are either removably connected to the vehicle or are connected to the vehicle for movement into and out of an operative position, the prior art lifting jacks require either that the jack be permanently secured to the vehicle or the vehicle by extensively modified to receive the jack in a manner that it can be connected and disconnected to the vehicle.

SUMMARY OF THE INVENTION

In accordance with the present invention, there is provided a lifting jack that includes a jack housing. The jack housing has an internally threaded portion and a support portion integral with the housing. A receiver is fixedly positioned to receive the jack housing support portion. Means is provided for removably connecting the jack housing support portion to the receiver to permit pivotal movement of the jack housing support portion relative to the receiver. A threaded jack screw is threadedly positioned in the jack housing internally threaded portion. A swivel base supports the threaded jack screw. Means is provided for turning the threaded jack screw in a selected direction to raise and lower the jack housing while permitting pivotal movement of the jack housing support.

Further in accordance with the present invention, there is provided a lifting jack for a rail car that includes a rail car coupler receiver. A jack housing has a first portion with an internally threaded bore and a second portion is positioned in the rail car coupler receiver for pivotal movement relative to the rail car coupler receiver. Means is provided for releasably connecting the jack housing second portion to the rail car coupler receiver for pivotal movement of the jack housing. A threaded jack screw is threadedly positioned in the jack housing internally threaded bore. Base support means supports the threaded jack screw for pivotal movement. Power means is provided for actuating rotation of the threaded jack screw in a selected direction to raise and lower the jack housing together with the rail car coupler receiver secured thereto.

The second portion of the jack housing has a configuration adapted for efficient movement into and out of the rail car coupler receiver. The rail car coupler receiver is normally operable to receive the automatic coupler of the rail car. Accordingly, by removing the automatic coupler from the coupler receiver, the coupler receiver is available for use to support the jack housing on the rail car. The jack housing second portion is pivotally movable within the coupler receiver.

The jack housing second portion is provided with slotted means to receive a pin of the coupler receiver that is normally utilized to hold the automatic coupler in the coupler receiver. With the jack housing second portion operatively positioned in the coupler receiver, the pin of the coupler receiver is extended down through the aligned slots of the coupler receiver and the jack housing second portion to connect the jack housing to the coupler receiver while permitting the jack housing to pivot about a horizontal axis relative to the coupler receiver. With this arrangement, the lifting jack is removably connected to existing equipment on the rail car and is pivotal about its point of connection on the rail car to permit the vehicle to be raised to a preselected height and move downwardly in an arc onto the rail.

Accordingly, the principal object of the present invention is to provide a lifting jack for a rail car that is secured to the rail car to permit both vertical and lateral movement of the car to safely return the car to the track.

Another object of the present invention is to provide a jack for re-railing a vehicle without encountering risk of injury to operating personnel.

An additional object of the present invention is to provide a lifting jack that is removably connected to the coupler receiver that is provided on a track vehicle to receive an automatic coupler for connecting adjacent track vehicles.

A further object of the present invention is to provide a lifting jack for a rail car in which the jack is adapted for pivotal connection to the receiver for the automatic coupler on the car.

These and other objects of the present invention will be more completely disclosed and described in the following specification, the accompanying drawings and the appended claims.

DESCRIPTION OF THE PREFERRED EMBODIMENTS

Figures 1, 2, 3:
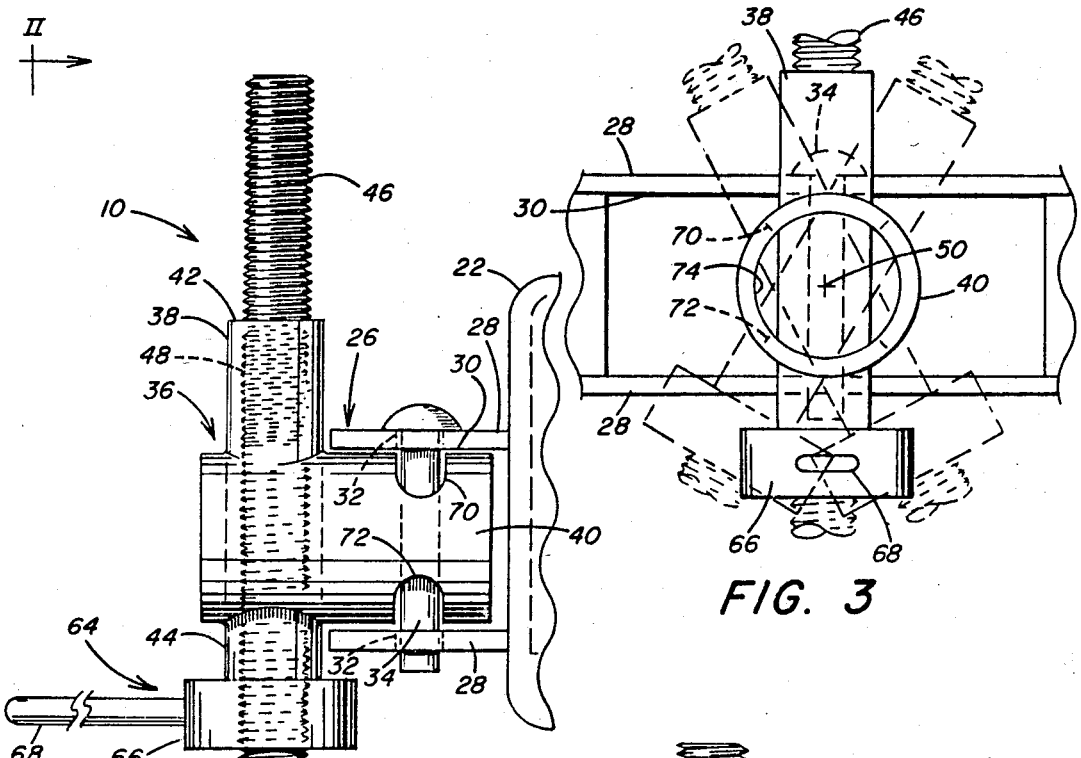
FIG. 1 is a view in side elevation of a re-railing jack of the present invention, illustrating the pivotal connection of the jack housing to the receiver of an automatic coupler for a rail vehicle to be lifted by the re-railing jack.
FIG. 2 is a front elevational view taken along line II—II of FIG. 1, illustrating in phantom lateral, pivoted positions of the jack.
FIG. 3 is a fragmentary, schematic illustration of the various pivoted positions of the jack when the jack housing is pivoted in the coupler receiver on the vehicle.

Referring to the drawings and, particularly to FIGS. 1, 2 and 4–7, there is illustrated a re-railing jack generally designated by the numeral 10 for replacing a derailed rail vehicle 12 upon the track 14. The jack 10 is adaptable for use on any type of vehicle that is track mounted, such as rail cars, and particularly for both above and below ground track equipment, such as locomotives and personnel carriers movable on track in underground mining operations. As illustrated in FIGS. 4–7, the rail vehicle 12 includes a body portion 16 which is supported on the track 14 by conventional wheels 18 and axle 20. As illustrated also in FIG. 1, the rail vehicle body 16 includes a bumper 22 formed by spaced apart plate members secured to the body 16 at the ends of the body 16. Positioned within the space between the plates forming the bumper 22 is a conventional coupling member 24, illustrated in FIG. 4.

The coupling member 24, as well-known in the art, is operable to automatically connect adjacent cars or vehicles to one another to form a continuous string of vehicles for movement on the track 14. The operation of the coupling member 24 is well-known in the art and will not be described herein in detail. The coupling member 24 is received in a coupler receiver or a coupler pocket 26 which is shown in FIG. 1 and in accordance with the present invention is adaptable to receive and connect the re-railing jack to the rail vehicle 12.

Figure 4:
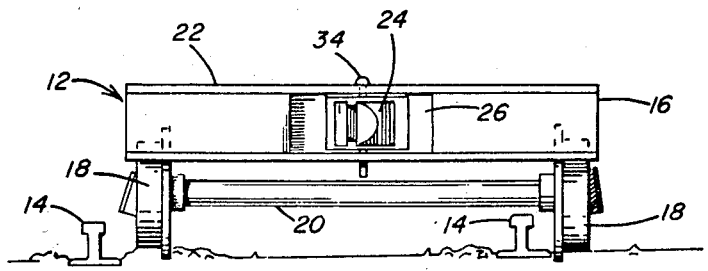
FIG. 4 is a schematic view, illustrating a rail vehicle derailed from the track, and the automatic coupler which is normally retained in the coupler receiver on the vehicle.
Figure 5:
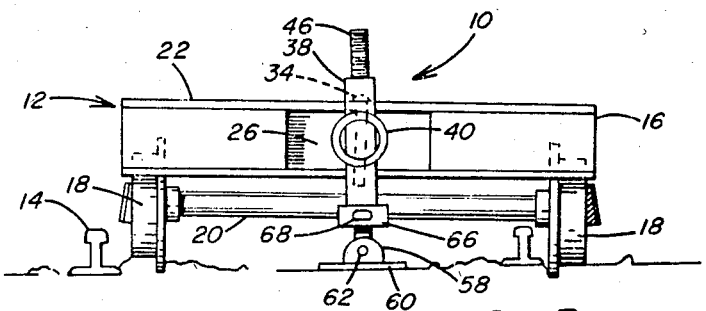
FIG. 5 is a view similar to FIG. 4 of the derailed vehicle, illustrating the automatic coupler removed from the coupler receiver on the vehicle and the lifting jack secured to the coupler receiver and anchored in position to return the vehicle to the track.
Figure 6:
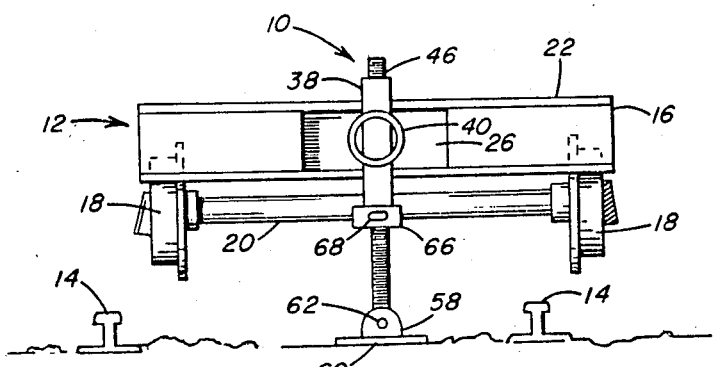
FIG. 6 is an operational, schematic view, illustrating the lifting jack in a pivoted position where the vehicle has fallen downwardly onto the track.

The coupler pocket 26 is conventional in design and is formed by plates 28 which are secured to the bumper 22. The plates 28 of the coupler pocket 26 form an opening 30 for receiving the coupling member 24 as shown in FIG. 4, as well as, the re-railing jack 10 of the present invention, as illustrated in FIG. 1. The coupler pocket plates 28 include aligned slots 32 shown in FIG. 1 for receiving a connecting pin 34, conventionally used to releasably connect the coupler member 24 to the coupler pocket 26 as shown in FIG. 4. As it will be explained later in greater detail, the connecting pin 34 used to connect the coupler member 24 to the coupler pocket 26 is also adaptable to releasably connect the re-railing jack 10 to the coupler pocket 26.

The re-railing jack 10, as illustrated in detail in FIGS. 1 and 2, includes a jack housing generally designated by the numeral 36 adapted for positioning in the coupler pocket 26. The jack housing 36 is pivotal in the pocket 26 as illustrated in FIG. 3 to position the re-railing jack 10 in inclined positions. The jack housing 36 includes an internally threaded portion 38 and a support portion 40. The internally threaded portion 38 extends down through the support portion 40. The housing portions 38 and 40 are integrally formed so that internally threaded portion 38 extends in substantially perpendicular relationship to the support portion 40.

The support portion 40 is removably positioned in the coupler pocket 26. The internally threaded portion 38 extends outwardly from the coupler pocket 26 and the bumper 22. The internally threaded portion 38 includes an upper end portion 42 and a lower end portion 44 and has a tubular configuration. The jack housing support portion 40 also has a tubular configuration as seen in FIG. 2. The diameter of the support portion 40 is greater than the diameter of the internally threaded portion 38 because the support portion 40 is received within the coupler pocket 26 and the internally threaded portion 38 threadedly receives a threaded jack screw 46. The internally threaded portion 38 of the jack housing 36 has an internally threaded bore 48 that extends from the upper end portion 42 to the lower end portion 44. With this arrangement, the threaded jack screw 46 is threadedly positioned in the jack housing 36.

The threaded jack screw 46 includes a lower end 52 supported by a bearing 54. A transverse bore 56 extends through the bearing 54. The bearing 54 is positioned between plates 58 of a clevis-type base 60. The clevis-type base 60 has a lower surface engageable with the ground for supporting the re-railing jack 10 to carry out the re-railing operation. The plates 58 have aligned holes which when aligned with the bore 56 of the bearing 54 are adaptable to receive a pin 62 to pivotally connect the threaded jack screw 46 to the clevis-type base 60, as illustrated in phantom in FIG. 2 and further in operation in FIG. 7.

Rotation of the threaded jack screw 46 is actuated by a suitable means, as for example, by a ratchet generally designated by the numeral 64 engaging the threaded jack screw 46. The ratchet 64 includes a conventional nut 66 for engaging the jack screw 46 and a ratchet handle 68. Rotation of the ratchet handle 68 in a preselected direction turns the nut 66 to raise and lower the jack housing 36 on the threaded jack screw 46. A hydraulic jack or lever operated ratchet jack can also be used in place of the ratchet 64.

As illustrated in FIG. 1, the jack housing support portion 40 includes a pair of elongated slots 70 and 72 that open into a bore 74 (shown in FIG. 2) of the jack housing support portion 40. The slots 70 and 72 are positioned in overlying relation. When the jack housing support portion 40 is positioned in the coupler pocket 26, the slots 70 and 72 are aligned with the slots 32 of the coupler pocket 26. The connecting pin 34 extends through the aligned slots 32, 70 and 72 to connect the jack housing 36 to the coupler pocket 26.

Figure 7:
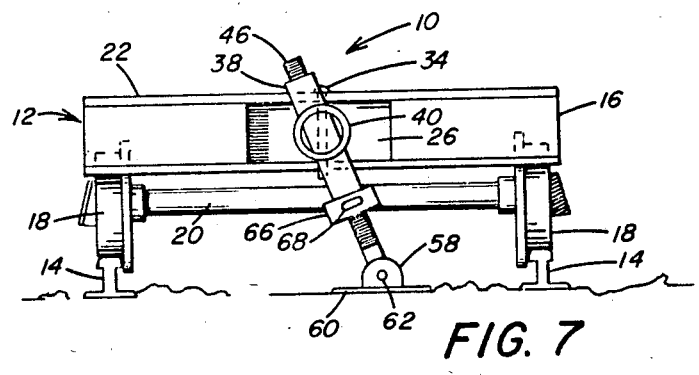
FIG. 7 is an operational, schematic view, illustrating the lifting jack in a pivoted position where the vehicle has fallen downwardly onto the trace.

With the above described arrangement, the jack housing 36 together with the jack screw 46 is pivotal about a horizontal axis 50 (FIG. 3) through the coupler pocket 26 at the point where the jack housing support portion 40 is connected to the coupler pocket 26. The degree of pivotal movement of the jack housing 36 is schematically illustrated in FIG. 3. Accordingly, the length of the slots 70 and 72 is selected to provide the desired degree of pivotal movement of the jack housing 36 and threaded jack screw 46. In this manner, the jack housing 36 and the jack screw 46 can be inclined at a preselected angle to facilitate the lateral movement of the rail vehicle 12 in an elevated position back on to the track 14 as illustrated in FIG. 7 and described hereinafter in greater detail.

The ratchet 64 is a hand-operated means for turning the threaded jack screw 46 is a selected direction to raise and lower the jack housing 36. This type of means is applicable for returning a light rail vehicle to the track 14 of the type illustrated in FIGS. 4-7. However, for heavier rail vehicles the hand-operated ratchet 64 can be substituted for a power-assisted device, such as an electric motor or an internal combustion engine through mechanical, hydraulic, pneumatic or other transmission medium. Therefore, it should be understood that the raising and lowering of the jack housing 36 together with the rail vehicle 12 can be accomplished by means other than the ratchet 64 and the present invention is not confined to the ratchet 64 as the means for raising and lowering the jack housing 36 on the threaded jack screw 46.

Now referring to FIGS. 4-7, there is illustrated the method of operation of the re-railing jack 10 for replacing a derailed vehicle 12 upon the track 14. In order to replace the derailed vehicle 12 upon the track 14 the automatic coupling member 24 retained in the coupler pocket 26 between the plates 28 of the bumper 22 is removed by first pulling the connecting pin 34 from connection of the coupling member 24 to the coupler pocket 26. When this is accomplished, the coupling member 24 is taken out of the coupler pocket 26 and the jack housing 36 is positioned in the pocket 26. The jack housing support portion 40 is positioned in the pocket 26 so that the slots 70 and 72 are aligned with the slots 32 to receive the connecting pin 34.

As illustrated in FIG. 4, the derailed vehicle 12 is tilted from a horizontal plane, and therefore, before the clevis-type base 60 is positioned on the ground the jack housing 36 is pivoted in the coupler pocket 26 to substantially, vertically position the threaded jack screw 46. Then the threaded jack screw 46 is firmly supported on the ground by the clevis-type base 60. Further in accordance with the present invention by utilizing the coupler pocket 26 for connecting the jack housing 36 to the rail vehicle 12, the lifting point of the re-railing jack 10 is on the longitudinal centerline of the rail vehicle 12. This substantially balances the raised vehicle to facilitate lateral movement of the rail vehicle 12 in a raised position back on to the track 14.

Once the re-railing jack 10 is firmly supported by the clevis-type base 60 engaging the ground, the jack housing 36 is advanced upwardly on the threaded jack screw 46 by rotation of the ratchet handle 68. Accordingly, as the jack housing 36 is raised the end of the vehicle is lifted to the desired height so that the wheels 18 are positioned above the track 14. After the vehicle 12 is raised to where the wheels 18 clear the track 14, the rail vehicle 12 is shifted laterally and by the pivotal support of the threaded jack screw 46 to the clevis-type base 60 the vehicle is permitted to fall in a downward arc on to the track 14.

With light rail vehicles, manpower can be used to push the vehicle laterally and downwardly on to the track. However, with heavier rail vehicles, mechanical or power actuated jacks can be utilized to laterally move the vehicle into position on the track 14. For those instances where a derailed vehicle is displaced a considerable distance from the track 14 it may be necessary to repeat the steps of lifting and laterally moving the vehicle to move the vehicle the required lateral distanced to return the wheels 18 to the track 14.

By pivotally connecting the jack housing 36 to the coupler pocket 26 the lateral movement of the vehicle is controlled so as to prevent the threaded jack screw 46 and the clevis-type base 60 from losing traction with the ground and thereby preventing the clevis-type base 60 from becoming displaced and flying out in a random direction in a hazardous manner. Furthermore, by lifting the vehicle about the longitudinal center line of the vehicle, greater control is provided in the lateral downward movement on to the track 14. It is well known that the rail vehicle 12 includes coupler pockets 26 at both ends of the vehicle so as to permit operation of the jack 12 at both ends of the vehicle to return all wheels of the vehicle 12 on to the track 14.

According to the provisions of the patent statutes, I have explained the principle, preferred construction and mode of operation of my invention and have illustrated and described what I now consider to represent its best embodiments. However, it should be understood that, within the scope of the appended claims, the invention may be practiced otherwise than as specifically illustrated and described.

I claim:

1. A lifting jack comprising,
   a jack housing, said jack housing having an internally threaded portion and a support portion integral with said housing,
a receiver fixedly positioned to receiver said jack housing support portion,
means for removably connecting said jack housing support portion to said receiver to permit pivotal movement of said jack housing support portion relative to said receiver,
said means for removably connecting said jack housing support portion to said receiver includes transverse slotted means in said support portion,
a connecting pin carried by said receiver and extending through said transverse slotted means such that said pin connects said support portion to said receiver while permitting angular removement of said support portion in said receiver relative to said pin,
a threaded jack screw threadedly positioned in said jack housing internally threaded portion,
a swivel base for supporting said threaded jack screw, and
means for turning said threaded jack screw in a selected direction to raise and lower said jack housing while permitting pivotal movement of said jack housing support.

2. A lifting jack as set forth in claim 1 in which, said receiver includes means for pivotally supporting said jack housing support portion at the location of connection of said receiver to said jack housing support portion.

3. A lifting jack as set forth in claim 1 in which, said jack housing internally threaded portion is connected to and extends through said jack housing support portion, and
said internally threaded portion being positioned perpendicular to said support portion to maintain said jack screw perpendicular to the pivotal axis of said support portion in said receiver.

4. A lifting jack as set forth in claim 1 in which, said means for removably connecting said jack housing support portion to said receiver includes transverse slotted means in said jack housing support portion, and
a connecting pin carried by said receiver and extending through said transverse slotted means such that said pin connects said jack housing support portion to said receiver while permitting angular movement of said support means in said receiver relative to said pin.

5. A lifting jack as set forth in claim 1 in which, said jack screw is angularly movable relative to said swivel base independent of angular movement of said jack screw to said receiver.

6. A lifting jack as set forth in claim 1 in which, said means for turning said threaded jack screw includes a ratchet engageable with said jack screw,
said ratchet being positioned on said jack screw,
said jack screw being supported for rotational movement on said swivel base, and
said jack screw being rotated by rotation of said ratchet to advance said jack housing along the length of said jack screw.

7. A lifting jack as set forth in claim 1 in which, said swivel base includes means for rotatably supporting said jack screw and means for supporting said rotatable jack screw for pivotal movement relative to said swivel base.

8. A lifting jack for a rail vehicle comprising,
a rail vehicle coupler receiver,
a jack housing having a first portion with an internally threaded bore and a second portion positioned in said rail vehicle coupler receiver for pivotal movement relative to said rail vehicle coupler receiver,
means for releasably connecting said jack housing second portion to said rail vehicle coupler receiver for pivotal movement of said jack housing,
said means for releasably connecting said jack housing second portion to said rail vehicle coupler receiver includes a pin member extending through said jack housing second portion and said rail vehicle coupler receiver,
means for receiving said pin member in said jack housing second portion to permit pivotal movement of said jack housing second portion through an angle relative to said pin member,
a threaded jack screw threadedly postioned in said jack housing internally threaded bore,
base support means for supporting said threaded jack screw for pivotal movement, and
power means for actuating rotation of said threaded jack screw in a selected direction to raise and lower said jack housing together with said rail vehicle coupler receiver.

9. A lifting jack for a rail vehicle as set forth in claim 8 which includes,
means for pivoting said jack housing together with said threaded jack screw about the connection of said jack housing second portion to said rail vehicle coupler receiver, and
said threaded jack screw being pivotally movable relative to said base support means for positioning said jack housing and said threaded jack screw at a preselected angle with respect to said rail vehicle coupler receiver.

10. A lifting jack for a rail vehicle as set forth in claim 8 in which,
said jack housing first portion is secured to and positioned perpendicular to said jack housing second portion, and
said jack housing first and second portions being pivotal about a horizontal pivot axis located at the point of connection of said jack housing second portion to said rail vehicle coupler.

11. A lifting jack for a rail vehicle as set forth in claim 8 in which,
said means for releasably connecting said jack housing second portion to said rail vehicle coupler receiver includes a pin member extending through said jack housing second portion and said rail vehicle coupler receiver, and
means for receiving said pin member in said jack housing second portion to permit pivotal movement of said jack housing second portion through an angle relative to said pin member.

12. A lifting jack for a rail vehicle as set forth in claim 8 in which,
said jack screw and said jack housing are angularly movable about selected axes relative to said rail vehicle coupler receiver.

* * * * *